United States Patent
Sip

(10) Patent No.: US 8,129,943 B2
(45) Date of Patent: Mar. 6, 2012

(54) INDUCTION CHARGER FOR CHARGING ELECTRONIC DEVICE

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 460 days.

(21) Appl. No.: 12/485,941

(22) Filed: Jun. 17, 2009

(65) Prior Publication Data

US 2010/0237824 A1    Sep. 23, 2010

(30) Foreign Application Priority Data

Mar. 17, 2009   (CN) .......................... 2009 1 0300918

(51) Int. Cl.
*H02J 7/00* (2006.01)
(52) U.S. Cl. ........................................ 320/108; 320/103
(58) Field of Classification Search ................. 320/103, 320/108, 109, 113, 115; 310/75 R, 78, 79, 310/83, 84, 92
See application file for complete search history.

(56) References Cited

U.S. PATENT DOCUMENTS

| | | | | |
|---|---|---|---|---|
| 6,683,438 | B2 * | 1/2004 | Park et al. | 320/108 |
| 2004/0145342 | A1 * | 7/2004 | Lyon | 320/108 |
| 2005/0085122 | A1 * | 4/2005 | Chiou | 439/500 |
| 2005/0189910 | A1 * | 9/2005 | Hui | 320/108 |
| 2007/0182367 | A1 * | 8/2007 | Partovi | 320/108 |

* cited by examiner

Primary Examiner — Samuel Berhanu
(74) Attorney, Agent, or Firm — Altis Law Group, Inc.

(57) ABSTRACT

An induction charger for charging an electronic device includes a carrying car, a transmission assembly, a permanent magnet, an alternating current power supply, and an induction coil. The carrying car includes a base defined at least four slots scatted therein, a cover defining a through hole, at least two rotatable shaft, and at least two pairs of wheels positioned on a corresponding rotatable shaft and received in and passed through one corresponding slot. The transmission assembly includes a gear case defining a first through hole and a second through hole, a first hollow shaft non-rotatably fixed to the permanent magnet, and a second hollow shaft being inserted into a corresponding rotatable shaft. The induction coil is positioned in the base and aligned with and substantially parallel to the permanent magnet, and is electrically connected to the alternating current power supply.

8 Claims, 4 Drawing Sheets

INDUCTION CHARGER FOR CHARGING ELECTRONIC DEVICE

BACKGROUND

1. Technical Field

The present disclosure relates to induction chargers.

2. Description of Related Art

A smart induction charger includes a storage battery, an induction coil, a carrying car, and a motor. The storage battery stores electrical energy in advance. The induction coil can wirelessly transfer the stored electrical energy to battery(s) of an electronic device. The carrying car carries the storage battery and the induction coil. The motor drives the carrying car to the electronic device to allow energy transfer between the smart induction charger and the electronic device. The drawback of the smart induction charger is that the cost is high due to the cost of the motor.

Therefore, what is desired is an induction charger that can overcome the above described drawback.

DETAILED DESCRIPTION

Figure 1:
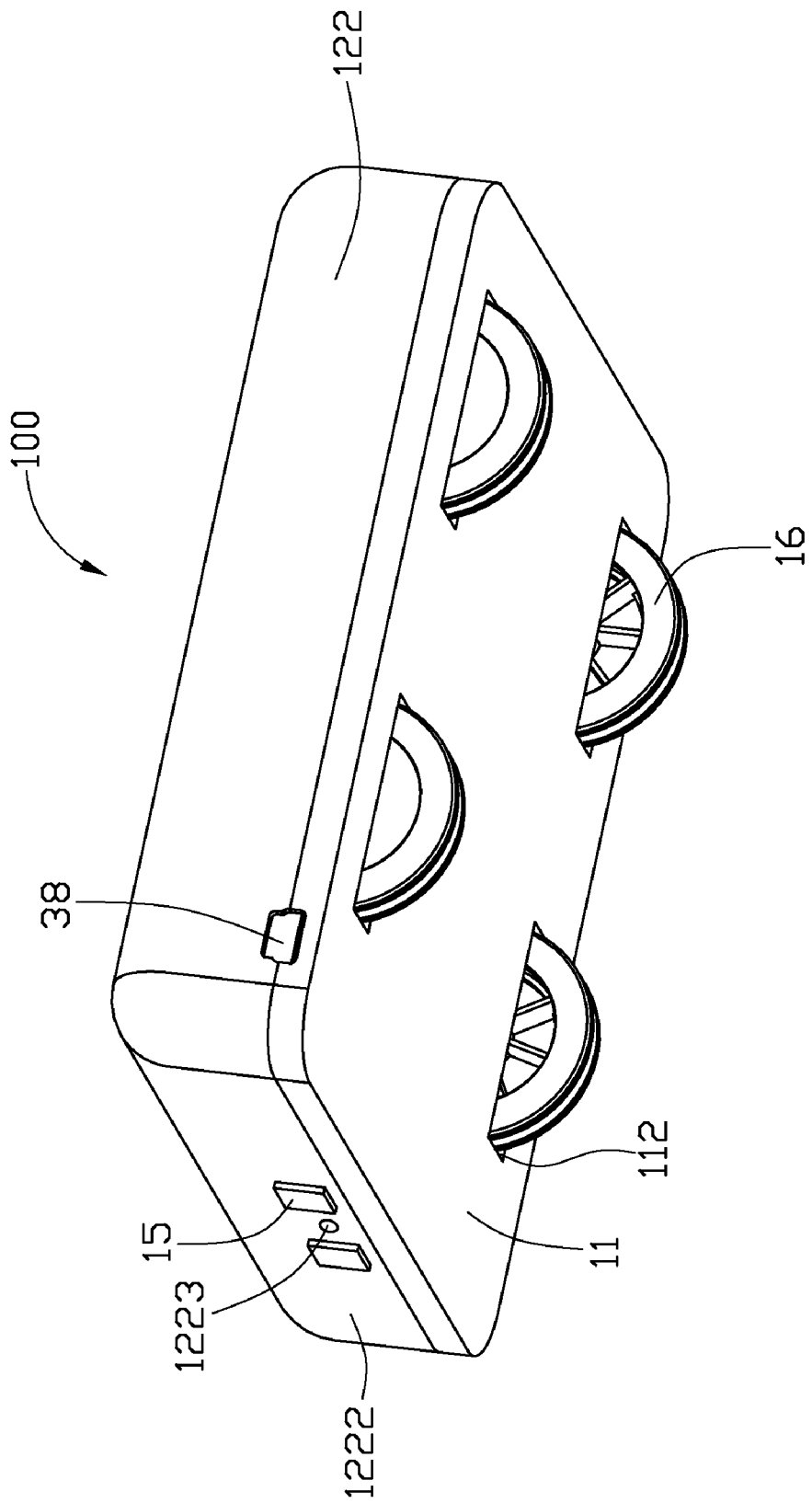
FIG. 1 is an assembled, isometric view of an induction charger in accordance with a first exemplary embodiment.
Figure 2:
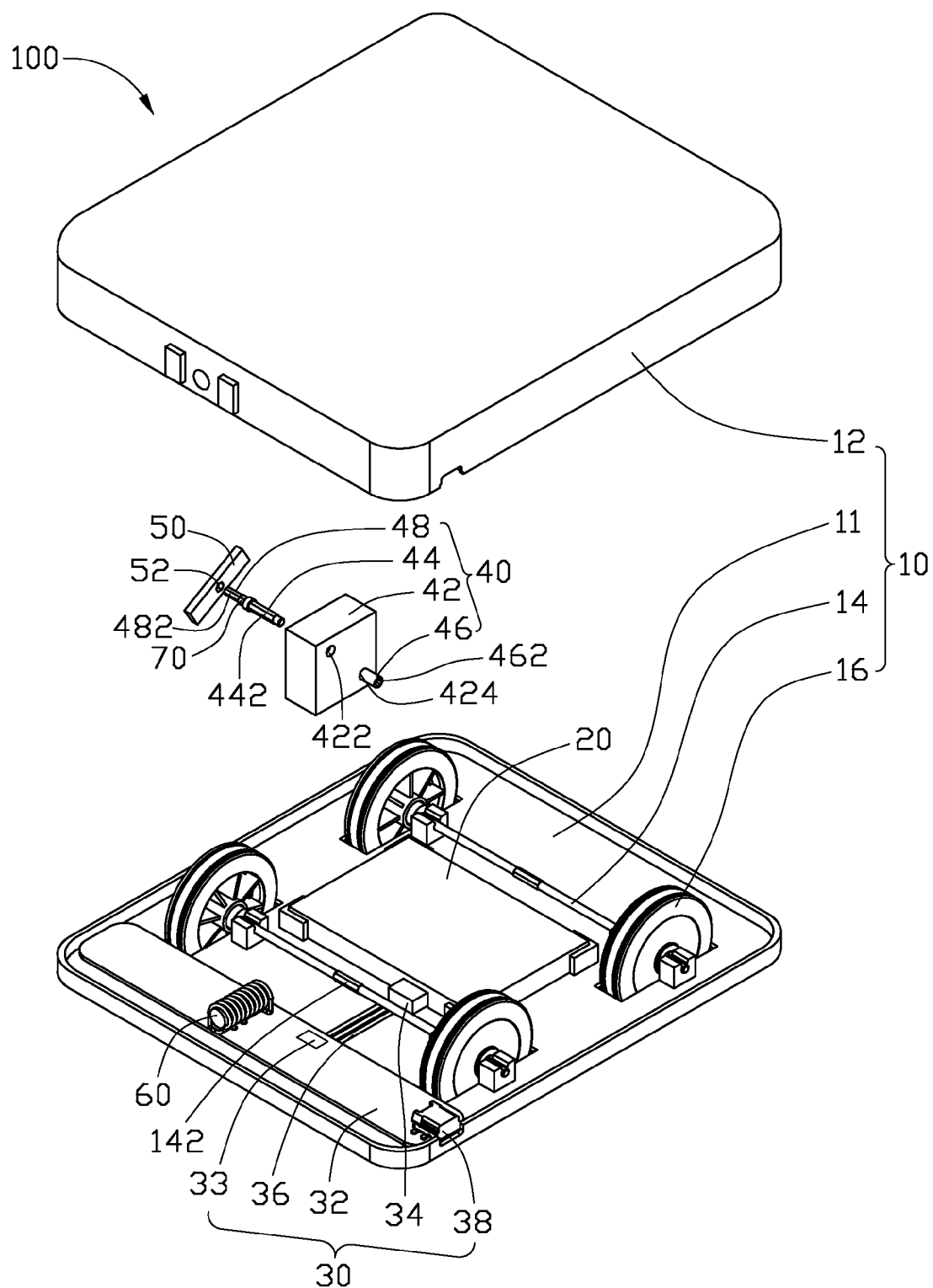
FIG. 2 is an exploded, isometric view of the induction charger of FIG. 1.
Figure 3:
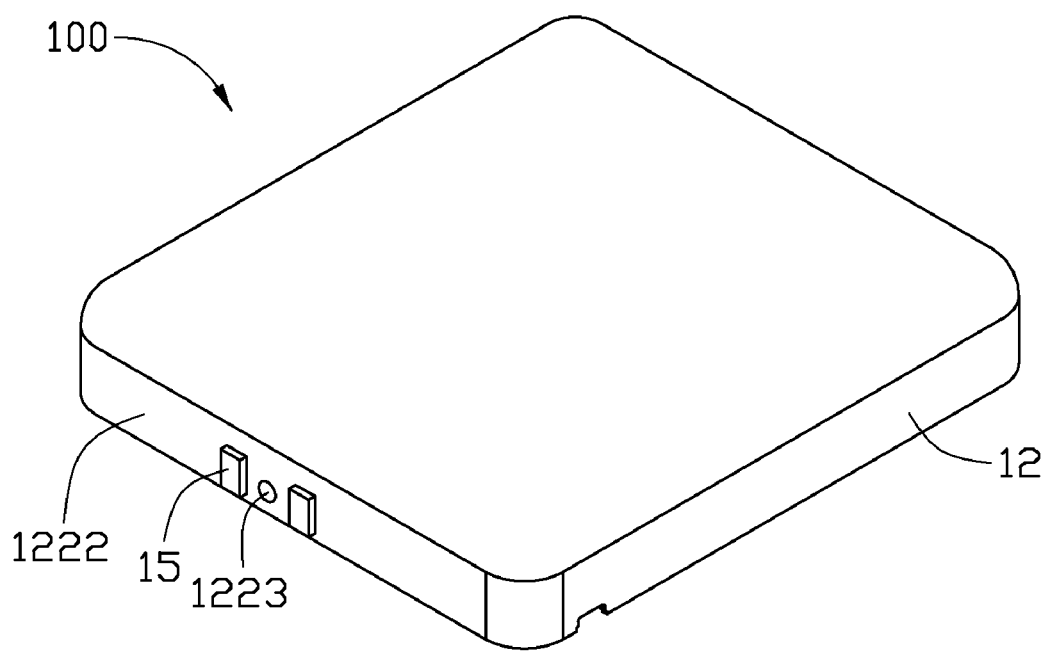
FIG. 3 is similar to FIG. 2, but a transmission assembly is assembled to a carrying car.
Figure 3:
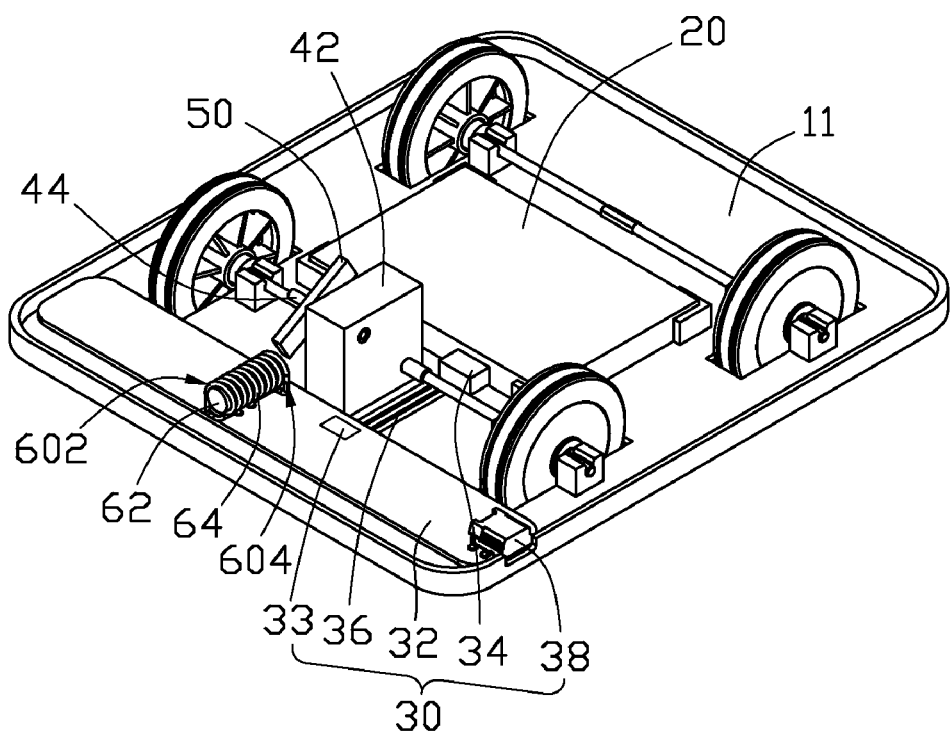

Referring to FIGS. 1-3, an induction charger 100 for charging an electronic device (not shown) in accordance with an exemplary embodiment is illustrated. The induction charger 100 includes a carrying car 10, a storage battery 20, a control circuit 30, a transmission assembly 40, a permanent magnet 50, and an induction coil 60. The storage battery 20, the control circuit 30, the transmission assembly 40, the permanent magnet 50, and the induction coil 60 are carried by the carrying car 10.

The carrying car 10 includes a base 11, a cover 12, two rotatable shafts 14, and two pairs of wheels 16. In this embodiment, the cover 12 includes a front sidewall 1222 and two connecting members 15. The front sidewall 1222 defines a through hole 1223 in the middle portion. The two connecting members 15 are sheets attached to the outer surface of the front sidewall 1222 and positioned substantially at two sides of the through hole 1223. In particular, the two connecting members 15 are substantially symmetrical with each other about the through hole 1223 and are aligned in a line parallel to the longer edge of the front sidewall 1222. The connecting members 15 are magnetic elements. The electronic device also has two corresponding magnetic elements. Therefore, the induction charger 100 and the electronic device can attract each other via the magnetic elements. It should be noted that, the number and specific position of the connecting members 15 are not limited to this embodiment. One of the rotatable shafts 14 adjacent to the front sidewall 1222 includes a first hexagonal section 142. The base 11 defines four slots 112 evenly scatted in the base 11. The two pairs of wheels 16 are attached to distal ends of the rotatable shafts 14 correspondingly. The wheels 16 are received in and passed through the slots 112.

The storage battery 20 is configured for storing electrical energy in advance. For example, the storage battery 20 is rechargeable battery and is charged before the induction charger 100 is used to charge the electronic device.

The control circuit 30 includes a main board 32 disposed on the base 11 close to the front sidewall 1222, a DC/AC converter 33, a connector 34, and electrical cables 36. The DC/AC converter 33 is disposed in the main board 32. The storage battery 20 is electrically connected to the DC/AC converter 33 via the connector 34 and the electrical cables 36. The DC/AC converter 33 is configured for converting direct current from the storage battery 20 into alternating current. In addition, the control circuit 30 further includes a signal receiver 38. The signal receiver 38 is configured for receiving a guiding signal transmitted from the electronic device and thereby guiding the induction charger 100 to move to a vicinity of the electronic device. In this embodiment, the guiding signal is infrared ray.

The transmission assembly 40 includes a gear case 42, a first hollow shaft 44, a second hollow shaft 46, and a third hollow shaft 48. The gear case 42 is cuboid in shape, and defines a first through hole 422, a second through hole 424, and includes a number of gear set (not shown) received in the interior of the gear case 42 and meshed with each other. The first and second through holes 422, 424 are defined in the gear case 42. The first hollow shaft 44 is inserted into the gear case 42 via the first through hole 422 and meshed with the gear set. The second hollow shaft 46 is inserted into the gear case 42 via the second through hole 424 and meshed with the gear set too. The first hollow shaft 44 has a second hexagonal section 442. The second hollow shaft 46 has a hexagonal inner cross-section 462. The third hollow shaft 48 has a third hexagonal section 482.

The permanent magnet 50 is strip-shape and defines a third hexagonal through hole 52 generally in the middle thereof. The permanent magnet 50 has different polarities at opposite ends. Half of the length of the permanent magnet 50 is shorter than the distance between the gear case 42 and the main board 32 of the control circuit 30.

The induction coil 60 includes an electromagnet 62 and a winding 64 wound around the electromagnet 62. In addition, the induction coil 60 includes a first end 602 and a second end 604 opposite to the first end 602.

In assembly, the third hexagonal section 482 non-rotatably fits into the third hexagonal through hole 52. The first hexagonal section 142 is non-rotatably engaged with the second hollow shaft 46. The induction coil 60 is generally positioned at the center of the main board 32 perpendicular to the rotatable shaft 14. The second end 604 is substantially aligned with the permanent magnet 50. The first end 602 is aligned with the through hole 1223. The winding 64 is electrically connected to the DC/AC converter 33.

In this embodiment, the induction charger 100 further includes an electromagnetic clutch 70. The electromagnetic clutch 70 is positioned between the gear case 42 and the permanent magnet 50, and is configured for controlling the first hollow shaft 44 and the permanent magnet 50 to engage or disengage with each other, thereby, controlling the wheels 16 to rotate or stop.

In use, when the electronic device needs to be recharged, the electronic device will send a guiding signal to the induction charger 100, and the signal receiver 38 receives the guiding signal. Then the control circuit 30 controls the clutch 70 to engage the first hollow shaft 44 with the permanent magnet 50. At the same time, the storage battery 20 provides power supply to the DC/AC converter 33. Next, the DC/AC converter 33 converts the direct current into alternating current flowing to the induction coil 60 to generate an alternating magnetic field. The alternating magnetic polarity of the induction coil 60 is the same as, or opposite to that of the permanent magnet 50, thereby, both the induction coil 60 and the permanent magnet 50 are capable of magnetizing or repulsing each other. Because the cycle of the DC/AC converter 33 of the control circuit 30 is equal to the time of the permanent magnet 50 rotating 180 degrees, the magnetic force generated by the induction coil 60 and the permanent magnet 50 rotates the rotatable shaft 14 to move the carrying car 10 toward the vicinity of the electronic device until the two connecting members 15 of the induction charger 100 contacts with the electronic device. Next, the control circuit 40 controls the electromagnetic clutch 70 to disengage the first hollow shaft 44 and the permanent magnet 50 to stop rotating the wheel 16. The induction charger 100 couples with the electronic device via the through hole 1223, and provides power stored in the storage battery 20 into the electronic device via the induction coil 60.

The induction coil 60 not only recharges the electronic device but also aid in the movement of the carrying car 10. As a result, The induction coil 60 replaces a motor, the induction charger 100 saves the volume for receiving a motor, and reduces the volume thereof.

Figure 4:
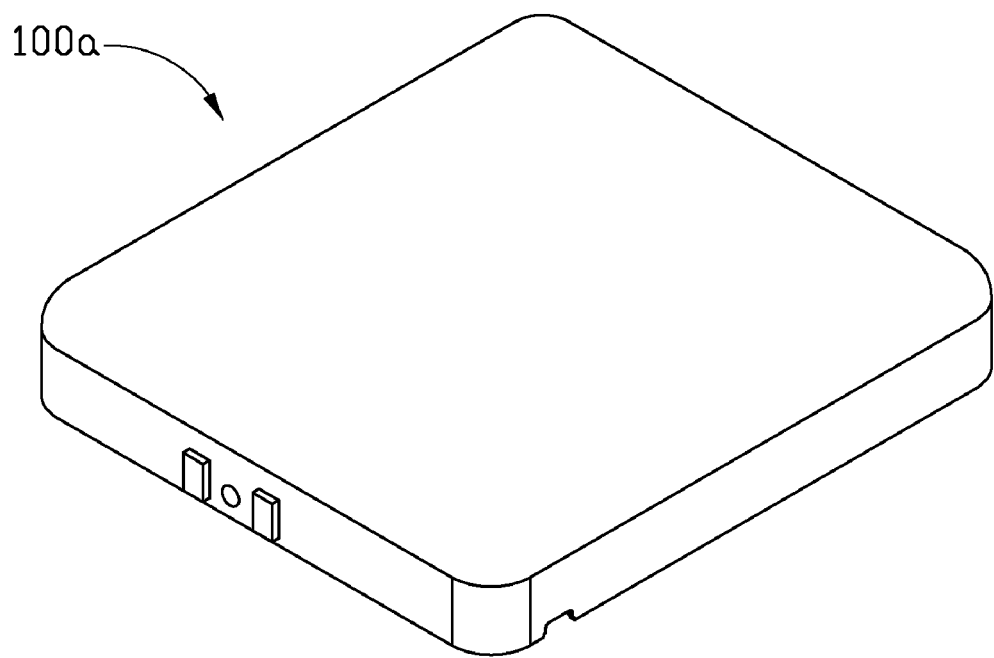
FIG. 4 is an isometric view of an induction charger, in accordance with a second exemplary embodiment.
Figure 4:
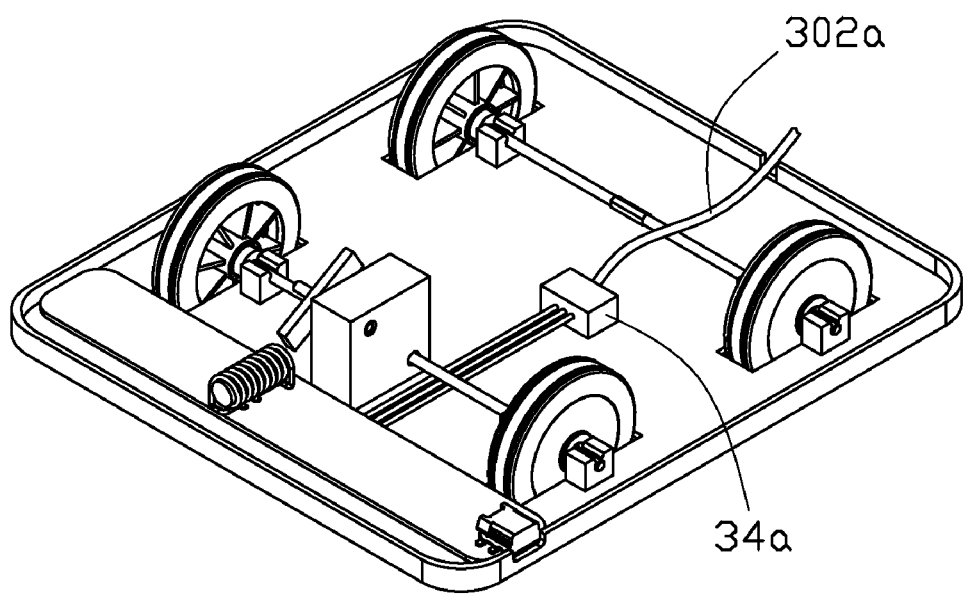

Referring to FIG. 4, an induction charger 100a in accordance with a second exemplary embodiment is disclosed. The induction charger 100a is essentially similar to the induction charger 100 of FIGS. 1-3, except for the power connector 34a. In this embodiment, the power connector 34a further includes a cable 302a having enough length and configured for directly connecting to an alternating current power supply. As a result, the induction charger 100a omit the storage battery thereby further reducing the volume of the induction charger 100a.

It will be understood that the above particular embodiments and methods are shown and described by way of illustration only. The principles and the features of the present invention may be employed in various and numerous embodiments thereof without departure from the scope of the invention as claimed. The above-described embodiments illustrate the scope of the invention but do not restrict the scope of the invention.

What is claimed is:

1. An induction charger for charging an electronic device, the induction charger comprising:
    a carrying car comprising: a base defining at least four slots scatted therein;
    at least two rotatable shafts; and at least two pairs of wheels positioned on a corresponding rotatable shaft and received in and passed through one corresponding slot;
    a permanent magnet;
    a transmission assembly comprising:
    a gear case having a first through hole and a second through hole;
    a first hollow shaft non-rotatably fixed to the permanent magnet; and
    a second hollow shaft being inserted into a corresponding rotatable shaft;
    an alternating current power supply; and
    an induction coil positioned in the base and aligned with and substantially parallel to the permanent magnet and electrically connected to the alternating current power the carrying car further includes a cover;
    the cover comprises a front sidewall; and a front side wall has a through hole;
    wherein: the induction charger further comprises a storage battery and a control circuit comprising a DC/AC converter; the storage battery is electrically connected to the DC/AC converter; the DC/AC converter is configured for converting direct current from the storage battery into alternating current to the induction coil to generate an alternating magnetic field to generate a magnetic force; and the magnetic force makes the rotatable shaft rotate and the wheels rotate;
    charger further comprising an electromagnetic clutch electrically connected to the control circuit;
    wherein the electromagnetic clutch is positioned between the gear case and the permanent magnet, and is configured for controlling the first hollow shaft and the permanent magnet to engage or disengage with each other to control the wheels to rotate or stop rotating.

2. The induction charger as claimed in claim 1, wherein the carrying car further comprises two connecting members positioned generally at the front sidewall and substantially symmetrical with each other about the through hole.

3. The induction charger as claimed in claim 1, wherein: the control circuit is positioned on the base close to the front sidewall; and half of the length of the permanent magnet is shorter than the distance between the gear case and the control circuit.

4. The induction charger as claimed in claim 1, wherein: one of the rotatable shafts comprises a first hexagonal section; and the second hollow shaft comprises a hexagonal inner cross-section corresponding with the first hexagonal section.

5. The induction charger as claimed in claim 1, wherein: the induction coil comprises an electromagnet and a winding wound around the electromagnet; the induction coil comprises a first end and a second end opposite to the first end; the first end is aligned with the through hole; and the second end is aligned with and substantially parallel to the permanent magnet.

6. The induction charger as claimed in claim 1, wherein the cycle of the DC/AC converter of the control circuit is equal to the time of the permanent magnet rotating 180 degrees.

7. The induction charger as claimed in claim 1, wherein the induction charger further comprises a cable having enough length and configured for directly connecting to the alternating current power supply.

8. The induction charger as claimed in claim 1, wherein: the permanent magnet defines a third hexagonal through hole generally in the middle thereof; the transmission assembly further comprises a third hollow shaft; the third hollow shaft comprises a third hexagonal section; and the third hexagonal section non-rotatably fits into the third hexagonal through hole.

* * * * *